March 7, 1967 J. R. SAGER 3,307,696
INSPECTING HYPODERMIC SYRINGE CARTRIDGES AND THE LIKE
Filed May 10, 1965 3 Sheets-Sheet 1

INVENTOR.
JAMES R. SAGER
BY
ATTORNEYS

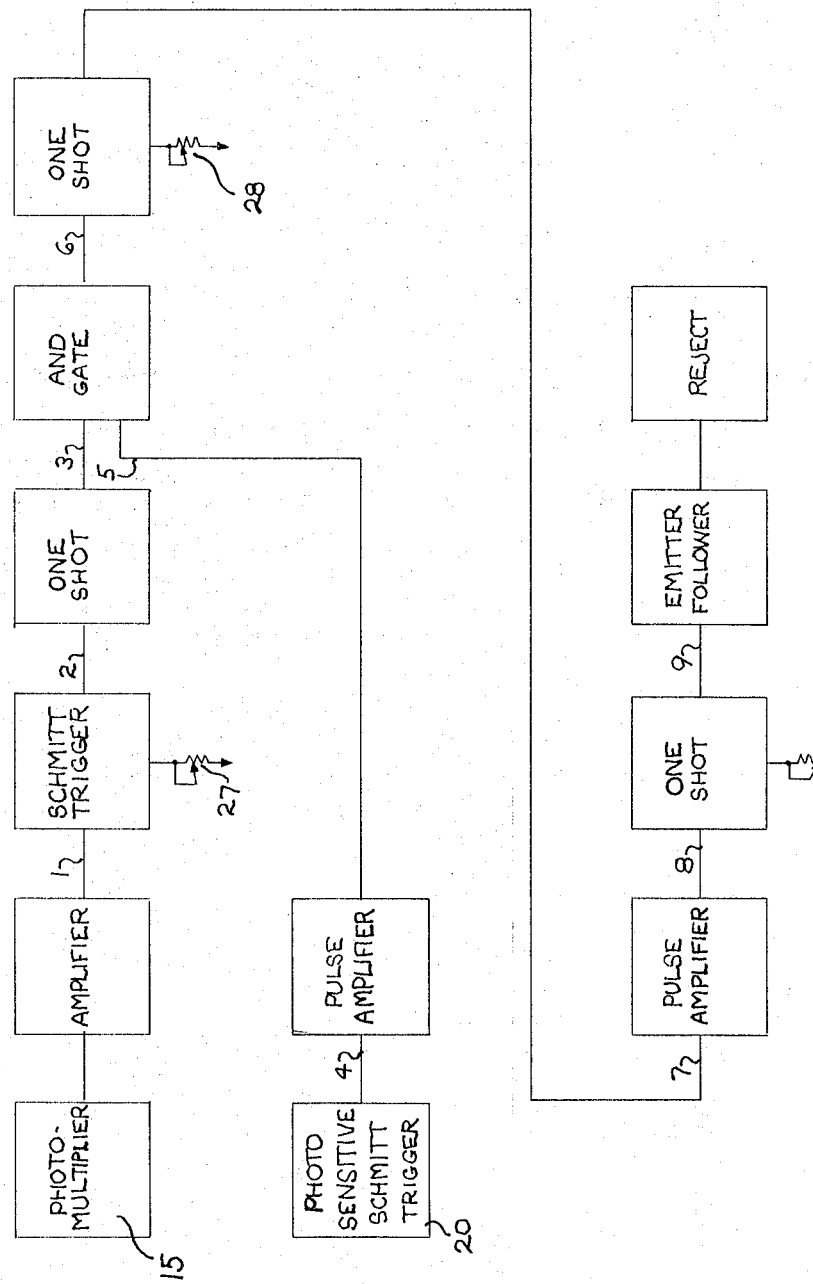

GOOD (A)

SUBSTANDARD (B)

United States Patent Office 3,307,696
Patented Mar. 7, 1967

3,307,696
INSPECTING HYPODERMIC SYRINGE CARTRIDGES AND THE LIKE
James R. Sager, Toledo, Ohio, assignor to Owens-Illinois, Inc., a corporation of Ohio
Filed May 10, 1965, Ser. No. 454,534
5 Claims. (Cl. 209—111.5)

This invention relates to inspecting hypodermic syringe cartridges and the like.

In the making of hypodermic syringe cartridges from a material such as glass, it is conventional to deform one end of the cylindrical blank into a small restricted end having an axial opening into which a needle is subsequently positioned. Such cartridges when used are then thrown away.

Because the opening in the restricted end of the cartridge is to be so small, the forming process utilizes a pin which is positioned in the end of the cylindrical blank serving to limit the deforming of the end so that when the pin is withdrawn, a small opening is left. Sometimes in the mass production of such cartridges, the pin breaks off and remains in position in the cartridge or the opening becomes otherwise restricted making the cartridge unsuitable for subsequent use.

It is an object of this invention to provide a method and apparatus for inspecting hypodermic syringe cartridges and the like to determine the presence of the desider axial opening in the restricted end thereof.

It is a further object of the invention to provide such a method and apparatus for inspecting such hypodermic syringe cartridges and the like as they are moving continuously past an inspection station at high speeds.

It is a further object of the invention to provide such a method and apparatus which is accurate, relatively easy to maintain and relatively low in cost.

Basically, the invention comprises moving the hypodermic syringe cartridges in a predetermined path with their axes generally transversely to the path past an inspection station, directing a beam of light, to which the glass is opaque, axially of the cartridges at the inspection station, and positioning a light sensitive element with its line of vision in line with the beam at the inspecting station so that any obstruction in the axial end opening of the cartridges will interrupt the passage of the beam. Further, in accordance with the invention, a beam and light sensitive element are provided for sensing the position of the cartridge at the inspecting station in order that a reject signal will be produced by the first-mentioned light sensitive element only when a cartridge is in position for inspection.

In the drawings:

FIG. 3 is a block diagram of the electronic system used in the apparatus;

Figure 1:
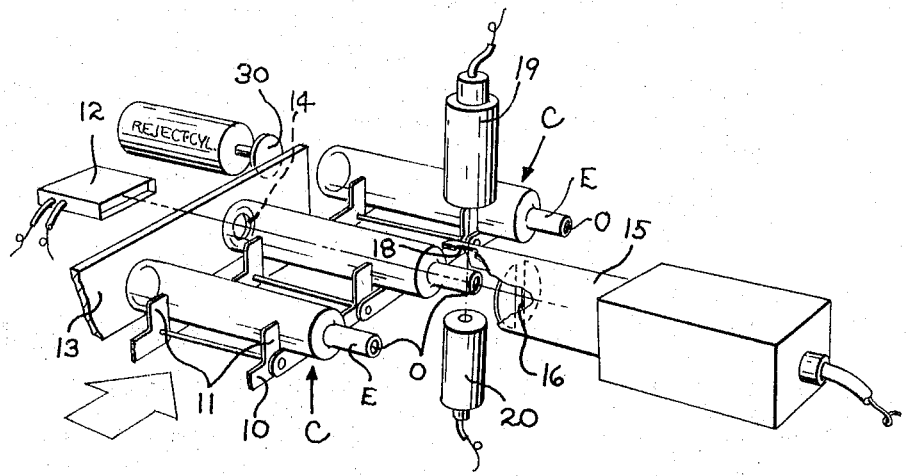
FIG. 1 is a partly diagrammatic perspective view of an apparatus embodying the invention.

Referring to FIG. 1, the apparatus comprises a conveyor 10 having longitudinally spaced pairs of lugs 11 for moving a series of hypodermic syringe cartridges C past an inspection station. Each hypodermic syringe cartridge C is positioned in the conveyor 10 with its axis at right angles to the path of the conveyor. Each of the cartridges C is formed with a restricted end E having an axial opening O. In accordance with the invention, as each cartridge moves past the inspection station, it is inspected to make certain that the axial opening O is unobstructed.

As shown in FIG. 1, a source of ultraviolet light 12 is directed toward a backing plate 13 against which the large, open ends of the cartridges bear during movement by the conveyor 10. A hole 14 is provided through the plate 13 at the inspection station. In this manner a wide beam of light is provided which extends transversely of the conveyor 10 at the inspecting station. A light sensitive device 15 in the form of a photomultiplier tube is positioned with its line of vision in alignment with the beam. The photomultiplier is provided, at its entrance end, with a vertical slot 16 through which the light passes. It has been found necessary that a slot be used, in that frequently the cartridges C, during high speed movement by the conveyor 10, have a tendency to bounce vertically. Specifically, the source 12 comprises an ultraviolet light source having a wave length output at approximately 2537 A. which directs a beam of radiation against the back of plate 13 in the area of the opening 14. The front portion of the photomultiplier tube is provided with a semicylindrical cowl 17 which serves to prevent stray radiation from reaching the slot 16 in the photomultiplier tube. The cowl 17 is provided with a slit 18 whose function will be described hereinafter. It should be emphasized at this time that the wave length of the radiation emitted by the source 12 is such that the glass of the cartridges is opaque thereto and therefore the only radiation that can pass out of the cartridge during the inspection interval must come through the restricted opening O. Obviously the photomultiplier is one which is sensitive to the radiation emitted by the source 12. In this fashion, a beam of radiation is provided which extends from the hole 14 into the large open end of a cartridge and then through the restricted opening O and falls on the photomultiplier tube 15. The amount of radiation which is seen by the phototube, during the inspection interval, will, obviously, depend upon the size of the opening O.

A position sensing device comprising a light source 19 and a light sensitive element 20 is provided at right angles to the path of movement of the restricted ends E of the cartridges. The beam of light from source 19 extends through the slit 18 in the cowl 17. The light sensitive element 20 senses the position of a cartridge to permit the inspecting element 15 to produce a signal in the event that the restricted end E of the cartridge is not open.

Figure 4A:
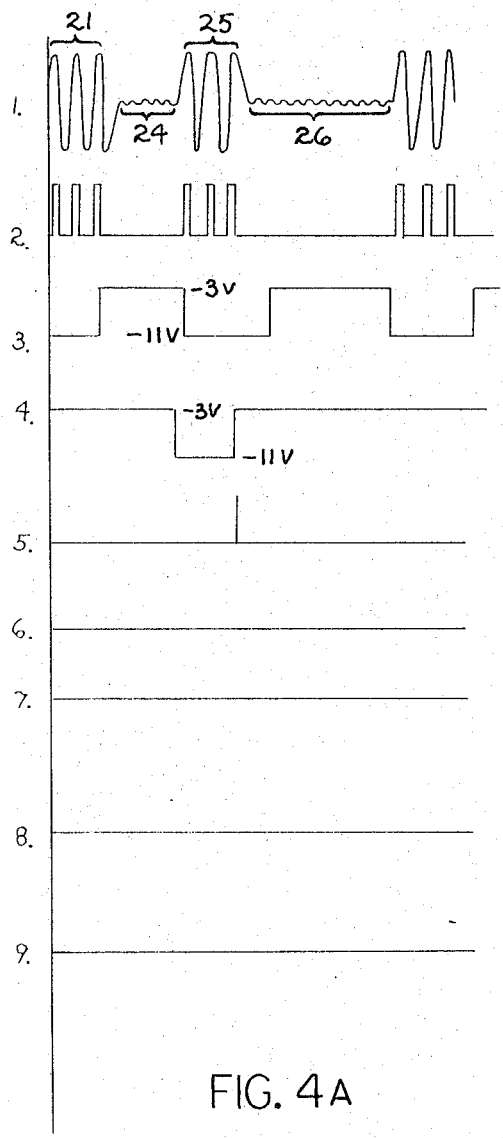
FIG. 4A shows a series of wave forms produced at points 1–9 of the electronic circuit of FIG. 3 when a good syringe cartridge is inspected; and, FIG. 4B shows a series of wave forms produced at points 1–9 of the electronic circuit of FIG. 3 when a substandard cartridge is inspected.
Figure 4B:
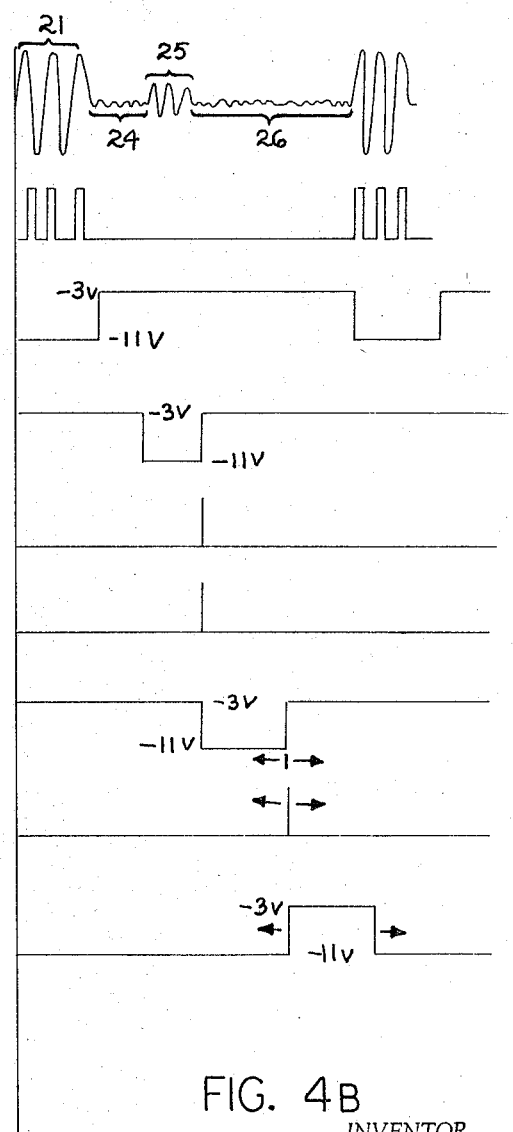

The electronic circuit associated with the mechanism is shown in FIG. 3 and the wave forms of the outputs of the various components of the electronic circuit are illustrated in FIGS. 4A and 4B.

FIG. 4A is a drawing of the wave forms which are produced during the testing or inspection of good syringe cartridges.

FIG. 4B illustrates the wave forms for signals which would be received when inspecting a substandard cartridge or one in which the neck opening is blocked.

Figure 2:
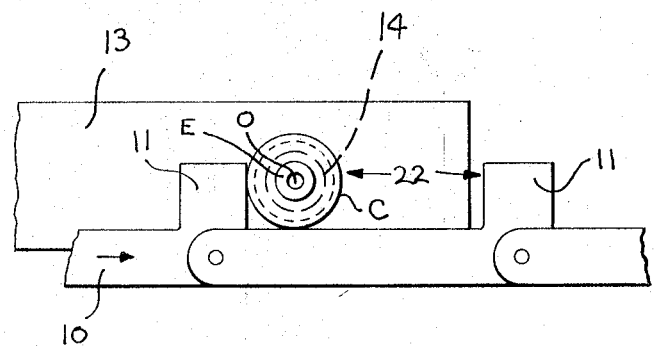
FIG. 2 is a fragmentary elevational view on an enlarged scale looking in the direction of the light source in FIG. 1.

In the normal operation of the device of FIGS. 1 and 2, the conveyor 10 moves samples continuously through the optical axis of the inspection apparatus. It should be understood that the photomultiplier tube 15 is viewing the radiation which passes through the hole 14 at all times. Thus, as is illustrated in FIG. 4A, the wave form 1 would correspond to the amplified signal output above of photomultiplier 15. Inasmuch as the radiation produced by the source 12 is incapable of penetrating glass, movement of the syringe cartridge into the beam of radiation will block the radiation falling on the photomultiplier 15, unless the neck opening O is clear.

As shown in FIG. 4A, wave form 1, the amplified output of the photomultiplier 15 will show a large signal which would correspond to the interval between the passage of the first lug 11 out of the beam and the leading edge of the syringe cartridge 3. This portion of the signal trace designated 21 on FIG. 4A, therefore, corresponds to the interval 22 in FIG. 2. As the cartridge is moved to the right in FIG. 2 by the conveyor 10, it will block the beam because the radiation will not pass through the glass. This would correspond to the interval 24, wherein it can be seen that the output of the photomultiplier is practically zero. As the cartridge then moves an additional amount to the right, as viewed in FIG. 2, the radiation will pass through the opening O in the cartridge and the photomultiplier 15 will produce an output signal corresponding to the interval 25.

When viewing FIG. 4B, it can be seen that if the opening O is blocked, the signal received at the output of the photomultiplier 15, during the interval 25, will be substantially reduced. As shown in FIG. 4B, wave form 1, continued movement of the cartridge to the right will again block the beam of radiation first by the cartridge itself and then by the movement of the second lug 11. This interval is indicated in FIGS. 4A and 4B by reference numeral 26. This cycle will repeat itself insofar as the wave forms are concerned during the continuous inspection of the series of cartridges moved through the inspection zone.

When the amplified output signal from the photomultiplier is of a predetermined amount, determined by the setting of a variable resistance 27 acting as a firing level control bias (see FIG. 3), the Schmitt trigger will fire producing a series of square wave signals, as shown in FIGS. 4A and 4B at wave form 2.

It should be understood that throughout this description references to the nine wave forms are indicated by reference numerals 1–9 on the electronic diagram of FIG. 3 at the points where the signals will be present.

The output of the Schmitt trigger, provided it has an output signal, will cause a one shot multivibrator to drop from −3 v. to −11 v., as illustrated in wave form 3. When a good syringe passes through the inspection zone, the one shot multivibrator output will drop to −11 v. as shown in wave form 3. The output of the one shot multivibrator is fed to an "AND" gate which is open when the input from the one shot is at −3 v. and closed when the input thereto is −11 v. Obviously, in order to prevent spurious readings or signals being received at the one shot which are indicative of a condition other than a signal received during the interval of inspecting a cartridge, such as the interval between the movement of the lugs and the syringe wall through the beam of radiation, it is necessary to control the "AND" gate so that it will operate only during the interval when the restricted end of a syringe cartridge is being viewed. To accomplish this, the photosensitive Schmitt trigger 20 is biased to provide an output when the beam from the light source 19 is interrupted by the movement of a syringe cartridge through the beam. Wave form 4 illustrates the output of the photosensitive Schmitt trigger which is dropped to −3 v. to −11 v. as the syringe passes the inspecting station. This output signal of the Schmitt trigger 20 is amplified by a pulse amplifier triggered by the positive going edge of the output signal from the photosensitive Schmitt trigger. Thus the signal which is received by the "AND" gate from the pulse amplifier is merely a positive going pulse, as illustrated in FIGS. 4A and 4B (wave form 5). The pulse from the pulse amplifier (wave form 5) cannot pass through the "AND" gate when the signal from the one shot indicates that a good syringe is being viewed, since the "AND" gate is closed by the one shot signal (wave form 3). However, the one shot signal, wave form 3 in FIG. 4B, opens the "AND" gate and the signal from the pulse amplifier will pass through the "AND" gate providing an output signal at 6 (see wave form 6 in FIG. 4B) when a substandard or clogged syringe is viewed. The signal from the "AND" gate drives a second one shot multivibrator producing a signal from the output of the one shot which drops from a −3 v. to −11 v., as shown in FIG. 4B, wave form 7.

The positive going trailing edge of the output signal from the one shot will fire the pulse amplifier producing an output signal in the form of a pulse, FIG. 4B, wave form 8. It should be pointed that the width of the output signal from the one shot, which is the signal at 7, is controlled by a pulse width control resistor 28.

The width control 28 is desirable from the standpoint that it will control the time of operation of the reject of the mechanism, keeping in mind the fact that the pulse amplifier output will occur in coincidence with the positive-going trailing edge signal received by the pulse amplifier from the one shot.

The output of the pulse amplifier in turn is fed to a one shot multivibrator whose output will be in the form of the wave trace illustrated in FIG. 4B, wave form 9. This signal is fed to an emitter follower and from the emitter follower to the reject mechanism and will serve to operate any suitable reject mechanism. Again, this signal is time adjustable due to the pulse width control 28 and the pulse width control 29. Thus it can be seen that the substandard syringe ejector plunger 30 will be operated by receipt of a signal from the emitter follower with the proper delay in the operation of the reject mechanism, so as to ensure that the bad cartridge is in position to be pushed from the conveyor 10.

Most of the above discussion has been with respect to inspection of the substandard cartridge; however, comparing the two wave form diagrams 4A and 4B, it can be seen that when a good cartridge is being inspected the wave forms will take the forms illustrated in FIG. 4A and there will be no output signal from the "AND" gate for the simple reason that the gate will be closed due to the fact that a signal was received at the "AND" gate from the one shot multivibrator. Thus the one shot is not triggered by the signals 6; therefore, the remaining components of the electronic system will not be triggered and no reject will result. The system is capable of inspecting syringe cartridges for no-hole while the samples are continuously moving through the inspection zone. No additional handling is required and a high inspection rate may be achieved.

Applicant has found that when normal, visible light is used to produce the inspecting beam, a very undesirable effect becomes apparent, namely, that the light would enter the edge of the large opening in the syringe cartridge and be piped along within the confines of the cartridge wall and emanate through the edge of the opening, even if the opening were clogged, thus providing an erroneous signal that the cartridge was open. In order to avoid such spurious readings, applicant has found that it is necessary to use a radiant energy source which produces a beam to which the glass is opaque. Such a radiation source which was found to be suitable is one having an output of 2537 angstroms. Thus the term "radiation," when used throughout this specification, means radiation to which glass is opaque.

Other and further modifications may be resorted to within the spirit and scope of the appended claims.

I claim:

1. The method of inspecting hypodermic syringe cartridge and the like to determine the presence of axial openings in the restricted ends thereof comprising the steps of moving a series of cartridges continuously in a predetermined path past an inspection station with their axes generally parallel to one another and extending transversely of said path, continuously directing a first beam of radiant energy to which the cartridges are opaque in a direction parallel to the axes of said cartridges at the inspection station from adjacent said other ends of said cartridges remote from said restricted ends whereby said beam normally passes through the opening in the restricted end of each cartridge, causing an obstruction in the opening in the restricted end of each cartridge to obstruct a portion of said beam as the cartridge moves past the inspection station, creating a first signal when said beam is obstructed, continuously directing a second beam transversely of the path of said syringe cartridges in position to be intersected by said cartridges, creating a second signal when a cartridge interrupts said second beam at the inspection station, and creating a reject signal when the first signal occurs during the second signal.

2. The method of inspecting hypodermic syringe cartridges and the like to determine the presence of axial openings in the restricted ends thereof comprising the steps of moving a series of cartridges in a predetermined path past an inspection station with their axes generally parallel to one another and extending transversely of said path, directing a first beam of radiant energy in a direction parallel to the axes of said cartridges at the inspection station from adjacent said other ends of said cartridges remote from said restricted ends whereby said beam normally passes through the opening in the restricted end of each cartridge, causing an obstruction in the opening in the restricted end of each cartridge to obstruct a portion of said beam as the cartridge moves to the inspection station, creating a first signal when said beam is obstructed, directing a second beam of radiant energy transversely of the path of said cartridges in position to be intersected by said cartridges, creating a positioning signal when a cartridge interrupts said second beam at the inspection station, and creating a reject signal when the first signal occurs substantially simultaneously with the positioning signal.

3. The method of inspecting hypodermic syringe cartridges and the like to determine the presence of axial openings in the restricted ends thereof comprising the steps of moving a series of cartridges in a predetermined path past an inspection station with their axes generally parallel to one another and extending transversely of said path, continuously directing a first beam of radiant energy in a direction parallel to the axes of said cartridges at the inspection station from adjacent said other ends of said cartridges remote from said restricted ends whereby said beam normally passes through the opening in the restricted end of each syringe, positioning a first radiation sensitive element adjacent the path of said restricted ends in alignment with said first beam, causing an obstruction in an end opening of each cartridge to obstruct a portion of said beam to said first light sensitive element as the syringe moves into the inspection station, continuously directing a second beam transversely of the path of said syringes in position to be intersected by said syringes, positioning a second light sensitive element adjacent the path of said cartridges in alignment with said second beam, creating a positioning signal when a syringe interrupts the passage of said second beam to said second light sensitive element at the inspection station, and creating a reject signal when the first signal occurs substantially simultaneously with the positioning signal.

4. An apparatus for inspecting hypodermic syringe cartridges or the like to determine the presence of end openings in the restricted ends thereof comprising means for supporting a series of cartridges and moving said cartridges in a predetermined path past an inspection station with their axes extending transversely of the path, means at said inspection station adjacent one end of said syringes for directing a first beam of radiant energy axially of said cartridges at a right angle to the path of said cartridges, means at said inspection station comprising a radiation-sensitive element positioned adjacent the path of the other end of said cartridges with its line of vision in alignment with said first beam, means at said inspection station for directing a second beam of radiant energy transversely of the path of the axes of said cartridges at a right angle to the axis of said first beam, light sensitive means positioned in the path of said second beam at said inspection station, means for producing a first signal when the first beam of radiant energy is interrupted by an obstruction in the end opening of the cartridge, means for producing a second signal when the second beam is obstructed by the presence of a cartridge at the inspection station, and means responsive to said second signal for conditioning said first signal producing means and producing a reject signal when the second signal occurs indicating that a cartridge is present at the inspection station and the passage of said first beam is interrupted by an obstruction in the end opening of the cartridge.

5. An apparatus for inspecting hypodermic syringe cartridges or the like to determine the presence of axial openings in the restricted ends thereof comprising means for supporting a cartridge with its ends unobstructed at an inspection station, means for directing a beam of radiant energy axially of said cartridge adjacent the end of said cartridge remote from said restricted end, radiation-sensitive means having a limited field of vision positioned adjacent the restricted end of said cartridge having its line of vision extending axially of the cartridge, means for creating a signal when an obstruction in the end opening of the cartridge causes a diminution in the light transmitted to the light sensitive means and means responsive to the presence of a cartridge on said support at said inspection station for conditioning said signal producing means so that a signal is produced only when a cartridge is present.

References Cited by the Examiner

UNITED STATES PATENTS

| | | | |
|---|---|---|---|
| 2,736,431 | 2/1956 | Coleman et al. | 209—111.7 |
| 2,753,459 | 7/1956 | Federchak | 250—83.3 |
| 3,128,385 | 4/1964 | Scharf et al. | 250—83.3 |
| 3,264,481 | 8/1966 | Hoegerl | 250—236 X |

M. HENSON WOOD, JR., *Primary Examiner.*

J. N. ERLICH, *Assistant Examiner.*